United States Patent [19]

Deeg et al.

[11] 3,763,052

[45] Oct. 2, 1973

[54] LOW THRESHOLD YTTRIUM SILICATE LASER GLASS WITH HIGH DAMAGE THRESHOLD

[75] Inventors: Emil W. Deeg, Woodstock, Conn.; Robert E. Graf, Southbridge, Mass.

[73] Assignee: American Optical Corporation, Southbridge, Mass.

[22] Filed: Aug. 12, 1971

[21] Appl. No.: 171,401

[52] U.S. Cl............................ 252/301.4 F, 106/52
[51] Int. Cl......... C09k 1/54, C03c 3/28, C03c 3/04
[58] Field of Search................. 252/301.4 F; 106/52

[56] References Cited
UNITED STATES PATENTS
3,663,474   5/1972   Lee et al. ..................... 252/301.4 F Primary Examiner—Oscar R. Vertiz
Assistant Examiner—J. Cooper
Attorney—William C. Nealon et al.

[57] ABSTRACT

Yttrium silicate laser glass having low thershold and high performance can be formed in all ceramic melting units. The glass is free of metallic inclusions and semiconductive inclusions. The laser glass is doped with trivalent neodymium ions.

3 Claims, No Drawings

LOW THRESHOLD YTTRIUM SILICATE LASER GLASS WITH HIGH DAMAGE THRESHOLD

When in operation, lasers produce tremendous amounts of energy and this energy internally of the glass of the laser causes metallic and semi-conductive inclusions to expand, move, vaporize, etc. thereby cracking or causing the glass to explode. These problems are overcome according to the method of glass production taught in copending application No. 63,593 of Emil Deeg and Elias Snitzer. The application was filed Aug. 13, 1970 and bears the title "Method of Producing Laser Glasses Having High Resistance to Internal Damage and the Product Produced Thereby." This application is now abandoned. The disclosure of that application relating to fabrication of laser glasses is incorporated herein by reference since the glasses of this invention are made according to the procedures and parameters set forth in that application.

It is also desirable to have laser glass characterized by a low threshold. The glasses of this invention satisfy that requirement. It is also desirable to have glass characterized by low fluorescent lifetime. The glasses of this invention also satisfy this requirement.

OBJECTS OF INVENTION

Included among the objects and advantages of the present invention is to provide yttrium silicate laser glasses with a high damage threshold, essentially no metallic or semi-conductive inclusions, and high gain.

This and other objects and advantages of the invention may be readily ascertained by referring to the following description and examples wherein laser glass according to this invention is described. The resulting glass is shaped by such known techniques as casting, extruding, pressing or drawing.

DESCRIPTION OF INVENTION

In general the composition of laser glasses made according to the invention contains ingredients in the following list within the weight percent listed.

| | |
|---|---|
| $SiO_2$ | 40–65 wt. % |
| CaO, BaO, MgO, SrO | 5–20 |
| $Y_2O_3$ | 5–20 |
| $Al_2O_3$ | 2–8 |
| $Nd_2O_3$ | 0.5–5 |
| $Li_2O, Na_2O, K_2O, Rb_2O, Cs_2O$ | 5–15 |
| (fining agent) 0.5 and 2 | |

The glass is of the high gain type with low threshold performance.

GENERAL DESCRIPTION OF INVENTION

Yttrium silicate laser glass according to the present invention is fabricated according to the techniques described and claimed in copending application No. 63,593 identified above. In its broadest aspect, laser glass according to the present invention falls within the following ingredient ranges within the weight percent listed.

| | |
|---|---|
| $SiO_2$ | 40–70 wt. % |
| Alkaline earth | 5–20 |
| $Y_2O_3$ | 5–20 |
| $Al_2O_3$ | 0–10 |
| $Nd_2O_3$ | 0.5–6 |
| Alkali oxide | 5–30 |

The glass inherently has a minor but effective amount of a fining agent. Any fining agent may be used. Examples are: $CeO_2$, $Sb_2O_3$, $As_2O_3$. We prefer $CeO_2$. The agent may amount to 0.5 to 2%. 1% is preferred. Of course, the overall theoretical weight percentage of ingredients must be 100% although analytical analysis may show numerical percentages somewhat less or greater than 100%.

Alternative alkali earth constituents in the foregoing examples may be a mixture. Likewise, the alkali oxide constituents may be a mixture.

The preferred composition and the best mode now known for the practice of the invention is made from a batch having the constituents shown for example 5 in the following table:

TABLE

| | 1 | 2 | 3 | 4 | 5 | 6 | 7 | 8 |
|---|---|---|---|---|---|---|---|---|
| $SiO_2$ | 58.00 | 57.00 | 57.00 | 53.00 | 58.00 | 58.00 | 37.14 | 39.63 |
| $Li_2O$ | — | — | — | — | — | — | 3.71 | — |
| $Na_2O$ | 30.00 | 26.00 | 30.00 | 20.00 | 15.00 | 15.00 | — | 15.84 |
| $Rb_2O$ | — | — | — | — | — | — | — | 24.75 |
| CaO | 6.00 | 6.00 | — | 12.00 | 12.00 | 12.00 | — | — |
| BaO | — | — | — | — | — | — | 40.61 | — |
| $Al_2O_3$ | — | — | — | 2.00 | 2.00 | 2.00 | 3.71 | 3.96 |
| $Y_2O_3$ | 2.00 | 7.00 | 9.00 | 9.00 | 9.00 | 9.00 | 11.12 | 11.86 |
| $CeO_2$ | 1.00 | 1.00 | 1.00 | 1.00 | 1.00 | 1.00 | — | — |
| $Nd_2O_3$ | 3.00 | 3.00 | 3.00 | 3.00 | 3.00 | 3.00 | 3.71 | 3.96 |
| | 100.00 | 100.00 | 100.00 | 100.00 | 100.00 | 100.00 | 100.00 | 100.00 |
| Melt size | 50 gm | 50 gm | 50 gm | 50 gm | 50 gm | 2 lbs. | 1 lb. | 1 lb. |
| Crucible | Pt.* | Pt. | Pt. | Pt. | Pt. | Pt. | ceramic† | ceramic |
| Relative lifetime** | 0.48 | 0.40 | 0.42 | 0.35 | 0.35 | 0.31 | Lost melt attacked ceramic crucible (note exceeded allowable limit of BaO) | Unmelted matter not sent for properties (Note total alkali oxides $Rb_2O$ and $Na_2O$ exceeded allowable limit) |

| Log viscosity | Temperature |
|---|---|
| 14.5 | 564 °C |
| 13.0 | 598 °C |
| 10.5 | 660 °C |
| 7.6 | 753 °C – |

†"ceramic" is a mullite crucible of the Coors Company identified "C–1–C".
* "Pt" is a platinum crucible.

**"Relative Lifetime" is fluorescent lifetime determined in the following manner: an optically surfaced sample (preferably one cubic centimeter or less and having about a one centimeter square, optically polished surface) is exposed to a pulse of white light produced by a xenon flash lamp of the type normally used for laser experiments (choice of lamp is unimportant as long as same type of lamp is used in the comparison). The flash tube is driven by an electronic pulse short as compared to the expected lifetime. For example, if expected lifetime is 0.7 milliseconds, the lamp is driven at 0.07, about 10 times less. The samples fluoresce and fluorescence is measured by photo-electronic means and comparative value are determined. In our tests, values of greater than 40 milliseconds are undesirable. It should be understood this test is an arbitrary means of comparing a group of samples. We assume that the curve of the decay of fluorescence intensity is a true exponential for the purpose of making fluorescent lifetime measurements. This is not really true for glass laser materials and the value of lifetime will vary depending where on the curve it has been measured. We do, however, still use the exponential decay formula to determine lifetime but the data are taken from the curve over some fixed time interval. The equation for exponential decay is:

$$I_2 = I_1 - \exp(-[t_2-t_1]/\tau) \text{ or}$$
$$\tau = [\ln(I_1/I_2) / (t_2-t_1)]^{-1}$$

and the variables are obtained from the curve. The values of $t_1$ and $t_2$ are arbitrarily chosen as $3 \times 10^{-4}$ and $6 \times 10^{-4}$ sec respectively. This allows the "tail" of the excitation light pulse to die down before the lifetime measurement is made so that no error will be introduced. These values of $t_1$ and $t_2$ must be adhered to closely when an accurate comparison of lifetimes is to be made. In our experience, as $t_1$ is allowed to increase, the measured value of lifetime increases. Increases by a factor of 2 have been observed.

$I_{1,2}$ = intensities of fluorescence at times $t_1$ and $t_2$ respectively: $\tau$ = fluorescent lifetime.

Each of the above-stated batch compositions were prepared according to standard weighing and mixing procedures. To avoid dusting and to reduce volatilization losses of batch constituents during the reaction phase of the melt, all batches are pelletized. The batch was filled in portions of approximately 300 grams into a preheated mullite crucible at approximately 1,400°C. When the filling and reacting phase was completed, the melt was gradually cooled to approximately 1,360°C, at which temperature fining of the melt occurred. This phase lasted approximately 10.5 hours. The ceramic utensils were formed of high purity mullite, which is the preferred composition of the utensils, although high purity alumina and fused silica may also be utilized.

During the succeeding period of approximately 44 hours, the melt was homogenized and conditioned while the batch temperature was lowered to and then maintained at approximately 1,110°C. Throughout the fining and homogenizing conditioning phase, the melt was stirred with a mullite stirrer. Finally, the desired laser glass was recovered by cooling to room temperature the homogenized mixture in billets of laser glass, the average size of which was approximately 100 cm in length and 8 cm in diameter.

Furthermore, where liquid corrosive melts are involved, such as Examples 2 and 3, platinum is a preferred crucible material to the ceramic given in the foregoing procedure.

We claim:

1. A laser glass composition consisting essentially of:

| | |
|---|---|
| $SiO_2$ | 40–70 wt. % |
| Alkaline earth oxide | 5–20 |
| $Y_2O_3$ | 5–20 |
| $Al_2O_3$ | 0–10 |
| $Nd_2O_3$ | 0.5–6 |
| Alkali oxide | 5–30 | effective amount of a fining agent.
provided the total weight percent equals 100 weight percent, said glass having low threshold performance, being of the high gain type and being free of metallic and semi-conductive inclusions and reduced tendency towards microphase separation and devitrification.

2. Yttrium silicate laser glass according to claim 1 consisting essentially of:

$SiO_2$ 40–65 wt. %
an alkaline earth oxide selected from the group consisting of

| | |
|---|---|
| CaO, BaO, MgO, SrO and mixtures | 5–20 |
| $Y_2O_3$ | 5–20 |
| $Al_2O_3$ | 2–8 |
| $Nd_2O_3$ | 0.5–5 | an alkali oxide selected from the group consisting of

| | |
|---|---|
| $Li_2O$, $Na_2O$, $K_2O$, $Rb_2O$, $Cs_2O$, and mixtures | 5–15 | effective amount of a fining agent.

3. Yttrium silicate laser glass according to claim 1 having the following oxide analysis:

| | |
|---|---|
| $SiO_2$ | 58 wt. % |
| CaO | 12 |
| $Y_2O_3$ | 9 |
| $Al_2O_3$ | 2 |
| $Nd_2O_3$ | 3 |
| $Na_2O$ | 15 |
| $CeO_2$ | 1 |

* * * * *